INVENTORS
Adolf LOGES
Karl HUFF

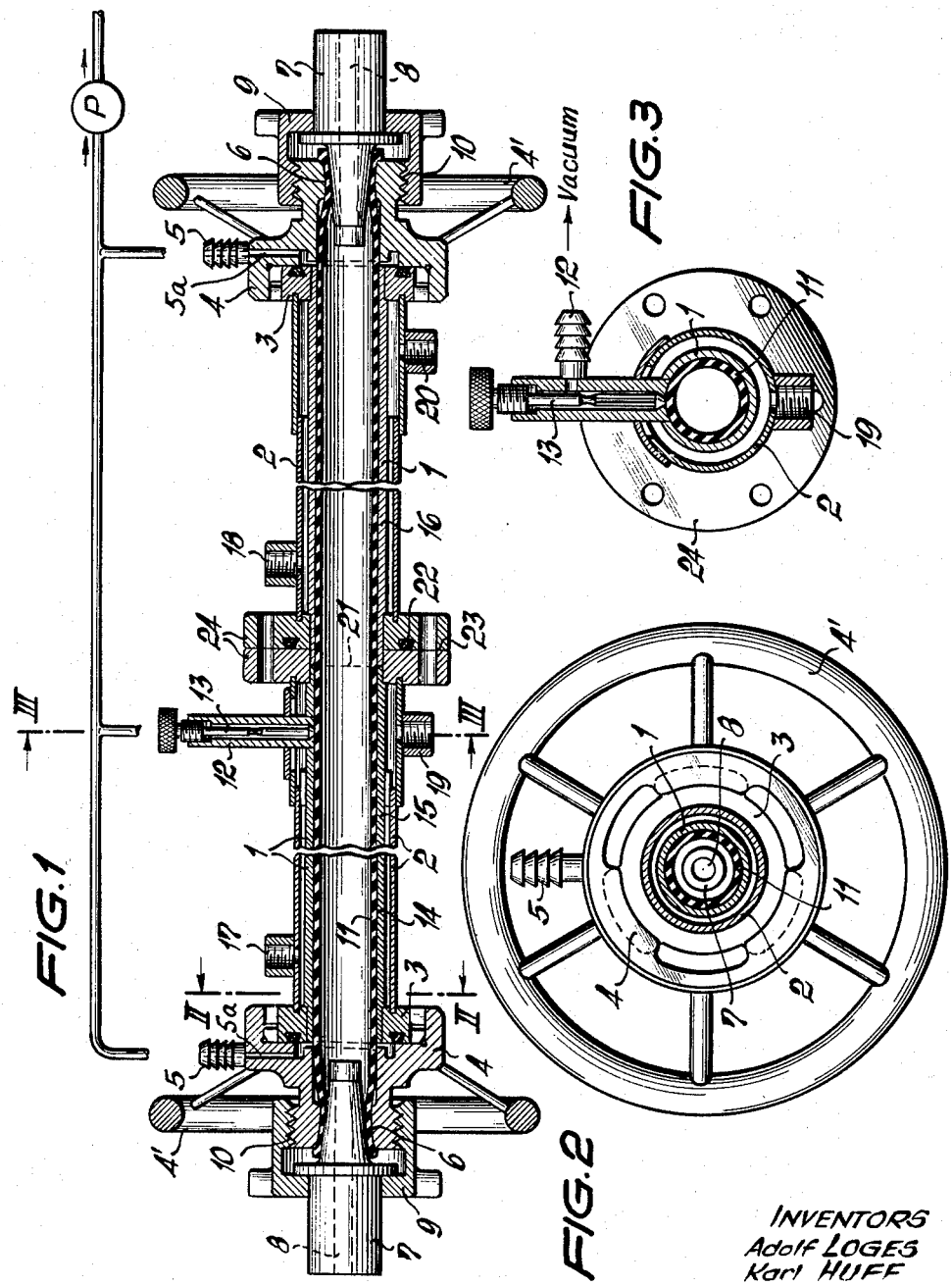

By Toulmin & Toulmin
Attorneys

United States Patent Office 3,175,246
Patented Mar. 30, 1965

3,175,246
APPARATUS FOR HEAT TREATING LONG
LENGTHS OF HOSE
Adolf Loges, Hannover, and Karl Huff, Ahlem, Hannover,
Germany, assignors to Continental Gummi-Werke
Aktiengesellschaft, Hannover, Germany
Filed Nov. 24, 1961, Ser. No. 154,806
Claims priority, application Germany, Nov. 26, 1960,
C 22,835; Dec. 3, 1960, C 22,884
1 Claim. (Cl. 18—6)

The present invention relates to the manufacture of hoses from rubber or rubber-like material, more particularly, to an apparatus for manufacturing such hoses having reinforcing structure therein by subjecting the hose to a thermal treatment in an apparatus which comprises several sections of heating tubes joined together and which extend over at least a substantial part of the length of the hose while tightly enclosing the hose.

In previous structures devised for the heat treatment of hoses of rubber or rubber-like materials the hoses are heated in a mold which is longitudinally split, so that the finished vulcanized hose has a longitudinally extending burr formed by the longitudinal joint of the mold. Generally, the burr is removed by hand and this process impairs the overall apearance of the entire surface and also adds considerable cost to the finished product because of this hand process.

The tubular heating element in which the hose is vulcanized is of the order of 100 meters long and is divided into sections ranging from 5 to 10 meters. The sections are interconnected through flanges which are welded to the ends of the tubular heating elements and to the heating jackets surrounding these heating tubes. It was found, however, that this welding resulted in a permanent deformation of the flanges which reduced the cross-sectional area of the heating tube. Since the hoses heated in the tubes are in intimate contact with the tube surfaces, it can be seen that these deformations of the flanges greatly increased the difficulty of removing the completed hoses from the heating tube. In some cases it was impossible to remove the finished hose from the heating tubes without destroying or seriously damaging the hose.

Other problems comprised obtaining a close joining of the ends of the heating tubes projecting from the several sections in order to obtain a smooth surface of the completed hose. In addition, the mechanical stresses in the heating tubes and the surrounding heating jacket tube, because of the repeated heating and cooling of these members, resulted in permanent distortion in the heating apparatus which, accordingly, affected the finished hose product.

It is therefore the principal object of the present invention to provide a novel and improved apparatus for the heat treating of hoses of rubber and rubber-like materials in a jacketed heating tube which extends over a substantial length of the surface of the hose.

It is a further object of the present invention to produce an apparatus for the heat treating of such hoses wherein the outer surface of the hose is brought into intimate contact with the surface of the heating tube.

It is an additional object of the present invention to provide an improved heating jacket structure surrounding the heating tube of this hose manufacturing apparatus.

It is another object of the present invention to provide improvements in the flanges on the ends of the heating tube sections whereby repeated heating and cooling of these sections would not produce any deformations in the flanges.

The apparatus of the present invention essentially comprises a long tubular heating element which may have a length up to 100 meters and is sufficiently long to enclose a hose therein. This apparatus comprises a heating tube which closely surrounds the outer surface of the hose and the second tube surrounding the heating tube so as to form a heating jacket therebetween. The apparatus is formed of a plurality of tubular sections, each of the sections having flanges on the ends thereof. The sections are connected by fastening means passed through the flanges.

In order that the outer surface of the hose is in intimate contact with the inner surface of the heating tube, a fluid pressure medium is introduced into the center of the hose and maintained at a pressure therein so as to urge the hose against the walls of the heating tube.

At the same time, a vacuum is established between the outer surface of the hose and the inner surface of the heating tube.

The outer tube of a section which forms the heating jacket is formed of a plurality of tubular members which are telescopingly arranged with respect to each other and which are welded both to themselves and to the end flanges.

In order to minimize the stresses in the end flanges arising from repeated heating and cooling thereof, the flanges are provided with central extensions which project inwardly toward the center of the heating tube sections. The ends of the heating tubes are closely received within these flange extensions and welded thereto. The annular faces of the end flanges in the heating jackets are provided with bored recesses.

Other objects and advantages of this invention will be readily apparent upon reference to the accompanying description when taken in conjunction with the following drawings, wherein FIGURE 1 is a longitudinal, sectional view taken through the entire heating installation;

FIGURE 2 is a tranverse sectional view taken along the line II—II of FIGURE 1 and showing the coupling at the end of the heating tube;

FIGURE 3 is a sectional view taken along the line III—III of FIGURE 1;

A specific embodiment together with several modifications thereof will next be described in detail with reference to the above figures wherein like reference symbols indicate the same parts throughout the various views.

Figure 4:
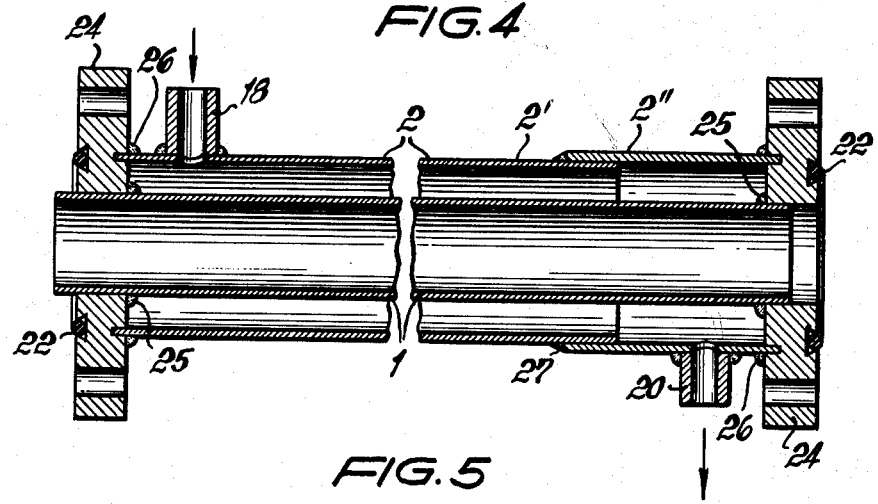
FIGURE 4 is a longitudinal sectional view taken through one section of the tubular apparatus and showing in detail the structure of the outer tubular member and its fastening to the flanges.

With particular reference to FIGURES 1 through 3, the hose vulcanizing or heat treating apparatus of this invention comprises a plurality of sections or heating chambers. With this structure the several heating chambers can simultaneously be brought to the necessary temperature for carrying out the heat treating process. Thus, the time of obtaining the desired temperature is considerably shorter than if the entire heating apparatus comprised a single heating chamber.

A heating chamber comprises a heating tube 1 surrounded by an outer tube 2 which forms a heating jacket therewith. The heating tube 1 has a bayonet coupling or connection member 3 fixedly mounted thereon. An outer bayonet connection member 4 is adapted to be coupled to the connection member 3 and is provided with a vacuum connection 5 which connects with a passage 5a in the connection member 4.

The outer bayonet coupling member comprises a hand wheel 4' to facilitate the coupling operation. The coupling member 4 is provided with a central opening 6 which is tapered and receives a tapered conical member 7 provided with a longitudinal bore 8. A nut 9 is positioned over the conical member 7 and is connected with the outer bayonet member 4 by a joint 10.

The hose which is to be treated as indicated at 11 and is positioned within the heating tube 1. The ends of the hose 11a and 11b are positioned in the opening 6 and the tapered member 7 is inserted into the ends of the hose shown in FIGURE 1.

There is a vacuum connection 12 mounted on the heating tube 1 and communicating with the inner surface thereof. This vacuum connection has a valve 13 therein.

Vacuum connections 5 and 12 lead to a conventional vacuum pump through pipe P shown in FIGURE 1.

A layer of silicone resin 14 is burnt or fused into the inner wall of the heating tube 1 in order to facilitate the removal of the finished hose from the mold formed by the heating tube 1.

As can be seen in FIGURE 1, the heating tube 1 is divided into a plurality of individual sections indicated at 15 and 16. Each section has inlet connections 17 and 18 for a heating medium and discharge outlets 19 and 20. The ends of the individual sections of the heating tube are indicated at 21 and are finished to provide a type of abutting joint when the plurality of sections of heating tube 1 are assembled together. Thus, a smooth inner surface is provided at the junctions of the heating tubes.

End flanges 24 are mounted on the ends of the heating tube sections with at least one of the flanges being provided with a sealing gasket 22 positioned in a groove in the outer face of the flange. The sealing plane or connection between the flanges 24 is indicated at 23 and is displaced axially from the connection of the heating tube ends 21. This is achieved by one end of a heating tube section being displaced inwardly of the outer face of its end flange and the other end of the heating tube section extending outwardly of the outer face of its end flange 24. When these ends of the heating tube sections are connected as shown in FIGURE 1, the ends of the heating tube sections will be displaced from the sealing joint plane 23 as shown in FIGURE 1.

The gaskets 22 are made from silicon rubber or a similar material in order to provide a heat-resistant high-temperature seal between the sections of the apparatus.

The valves 13 in the vacuum connections are of the electromagnetic type and are connected to a control circuit so as to be actuable simultaneously. As a result, the various heating tube sections can be simultaneously evacuated at several points so that the evacuation is rapidly performed. In this manner a uniform vacuum is achieved throughout the entire length of the hose positioned in the heat treating apparatus.

In carrying out the process of heat treating of the hose according to the present invention, and utilizing the apparatus described and illustrated herein, a hose which is to be treated is powdered and then introduced into the heating tube 1. Compressed air or water under pressure is then introduced into the interior of the hose through the bore 8 of the conical member 7. The interior of the hose is brought to a pressure of from 15 to 25 atmospheres whereby the hose is urged into intimate engagement with the inner surface of the heating tube 1. At the same time, a vacuum is established between the outer surface of the hose 11 and the inner surface of the heating tube 1 through the connections 5 and 12. A heating medium such as steam is then introduced into the heating jackets of each of the heating chambers through the inlets 17 and 18. While the outer surface of the hose 11 is thus in intimate contact with the entire surface of the heating tube 1, the hose is subjected to the heat treating process.

After the process has been completed, the removal of the hose from the heating tube is facilitated due to the layer of powder previously applied to the outer surface of the hose and the silicone resin lining of the heating tube 1.

Proceeding next to FIGURE 4 it can be seen that the heating tube 1 is welded to its end flanges 24 by the welds indicated at 25. The outer tube 2 is comprised of two tubular sections 2' and 2" which are in telescoping relationship to each other. The ends of these sections 2' and 2" are welded to the end flanges 24 by the welds 26 and are welded to each other by the weld 27.

In the fabrication of the heating chamber as illustrated in FIGURE 4, one of the end flanges 24 is first welded adjacent the end of the heating tube 1 by the welds 25. The outer tube members 2' and 2" are then loosely slipped onto the free end of the heating tube 1 and telescoped upon each other so that the second end flange 24 can be positioned over the other end of the heating tube and welded thereto. The welding seams 25 can then be examined. The tubular members 2' and 2" are then slid into the positions as shown in FIGURE 4 and the ends thereof welded to the end flanges 24 by the welds 26. The tubular members 2' and 2" are then welded to each other by the weld 27.

It is preferable that the heating medium inlet 18 be mounted in the smaller diameter tubular member 2' and the discharge connection 20 be mounted in the larger diameter tubular member 2". With this arrangement the discharge of water of condensation accumulating when the heating medium is steam will be at the deepest point of the heating jacket or in the larger diameter end thereof.

As a further modification, the outer tube 2 can be formed of three tubular members with two of the members having their ends welded to the end flanges 24 and their inner ends being spaced from each other. The third tubular member is then slipped over the inner ends of the first two tubular members to bridge the inner ends and is then welded to them. The diameter relationships of these tubular members is such that a tight fit is obtained.

Figure 5:
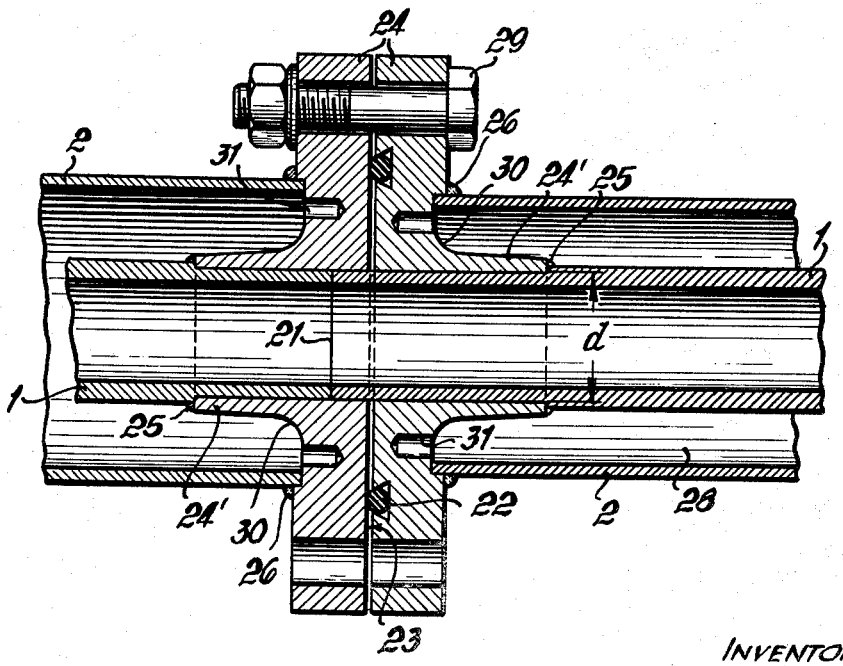
FIGURE 5 is a longitudinal sectional view taken through the connected ends of two tubular sections and showing in detail the end flanges of the sections.

Proceeding next to FIGURE 5 a further modification of this invention is illustrated with respect to the structure of the end flanges. The outer tube 2 is spaced from the heating tube 1 as shown in FIGURE 5 so as to form a heating jacket 28 therebetween. Each of the end flanges 24 is provided with a central extension 24' which extends inwardly toward the heating chamber or away from the sealing plane 23 between the end flanges. The internal diameter of the extensions 24' is indicated at $d$ and is slightly smaller than the outer diameter of the heating tube 1. The heating tube 1 is then welded to the flange 24 at 25. The ends of the heating tube indicated at 21 are off-set from the ends of the flanges in a manner as previously described.

The flanges 24 are connected together by bolts 29.

The annular surface of the end flange within the heating jacket 28 is indicated at 30 and has a plurality of bored recesses 31 drilled therein. These bores 31 are equally spaced on the flange surface 30 and function to enlarge the effective surface of the end flange 24 and to conduct the heating medium introduced into the jacket 28 directly into the interior of the flanges 24. As a result, the flanges will be heated more rapidly and the gap between heating of the thin-walled tubes 1 and 2 and the heavier flanges 24 will be greatly reduced. Since the flanges 24 and the tubes 1 and 2 are heated at a more uniform rate, the stresses on the welded joints 25 and 26 will be considerably reduced and will add greatly to the operating life of the heating chambers.

By utilizing the tubular extension 24' the heating medium within the jacket 28 conducts heat to the relatively thin-walled tubular extension 24' over which the heat is uniformly distributed as well as over the enclosed cross-section of the heating tube 1. The heat is no longer conducted directly to the rigid disk-shaped body of the flange 24. As a result of this uniform distribution of heat over the tubular extension 24' and the heating tube 1, any tensions formed after the cooling of the welded joint will remain entirely in the tubular extension 24' since this extension is a resilient body and hence will not produce changes in the cross-sectional area or shape within the heating tube 1. The elimination of such deformations of the heating tube 1 will greatly facilitate the removal of completed hoses from the heating tube.

Thus it can be seen that the present invention provides an apparatus for the heat-treating of hoses of rubber and rubber-like material. Because of the improvements in the construction of this apparatus, the apparatus will be longer lasting and will produce a uniform heat treatment of hoses positioned therein.

It will be understood that this invention is susceptible to modification in order to adapt it to different usages and conditions and, accordingly, it is desired to comprehend such modifications within this invention as may fall within the scope of the appended claim.

What is claimed as this invention is:

An apparatus for the heat treatment of long lengths of hose formed of a reinforced rubber or rubber-like material and comprising a fluid tight sectional heating jacket including an inner sectional heating tube having an intermediate joint closely surrounding a hose positioned therein for treatment, and a sectional outer tube having an intermediate joint surrounding said heating tube, the inner wall of said heating tube having a fused-in layer of silicone resin to facilitate the removal of treated hose therefrom, said heating jacket comprising a plurality of separate sections joined end-to-end, said sections each comprising said inner and said outer tubes welded at their ends to annular end members, the annular end members at said intermediate joints having flanges, said flanges of adjacent sections being secured together in face-to-face relation and the adjacent ends of the heating tubes being in abutting relation within the confines of one of said flanges, and wherein the extreme ends of said sectional heating jacket are each provided with a coupling member having bayonet connection therewith, said coupling member having a tapered central opening for receiving a tapered conical member, a vacuum connection for insuring a fluid tight seal with said heating jacket, means including said tapered conical member for introducing a fluid pressure medium into a hose positioned within said heating jacket to urge the hose surface into close engagement with the inner surface of said heating tube of the heating jacket, and inlet means and outlet means on the outer tubes of each of said heating jacket sections for circulating a heating medium through each heating jacket section.

References Cited in the file of this patent

UNITED STATES PATENTS

| | | |
|---|---|---|
| 808,027 | Eager | Dec. 19, 1905 |
| 1,686,498 | Parker | Oct. 2, 1928 |
| 1,871,490 | Barrett | Aug. 16, 1932 |
| 1,936,420 | Bailey | Nov. 21, 1933 |
| 1,962,400 | McWane | June 12, 1934 |
| 2,320,564 | Brooks | June 1, 1943 |
| 2,695,182 | Folz | Nov. 23, 1954 |